(12) United States Patent
Magklis et al.

(10) Patent No.: US 7,434,073 B2
(45) Date of Patent: Oct. 7, 2008

(54) FREQUENCY AND VOLTAGE SCALING ARCHITECTURE

(75) Inventors: Grigorios Magklis, Barcelona (ES); José González, Terrassa (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 10/999,786

(22) Filed: Nov. 29, 2004

(65) Prior Publication Data

US 2006/0117202 A1  Jun. 1, 2006

(51) Int. Cl.
*G06F 1/26* (2006.01)

(52) U.S. Cl. .................. 713/320; 713/300; 713/322; 713/323; 713/500

(58) Field of Classification Search ............. 713/400, 713/300, 320, 322, 323, 500
See application file for complete search history.

(56) References Cited

U.S. PATENT DOCUMENTS

| | | | |
|---|---|---|---|
| 7,194,643 B2 | 3/2007 | Gonzalez et al. | ............ 713/320 |
| 2006/0117202 A1 | 6/2006 | Magklis et al. | ............ 713/400 |
| 2007/0016817 A1* | 1/2007 | Albonesi et al. | ............ 713/500 |

FOREIGN PATENT DOCUMENTS

WO  PCT/US2005/041392  9/2006

OTHER PUBLICATIONS

Anoop Iyer and Diana Marculescu; "Power and Performance Evaluation of Globally Asynchronous Locally Synchronous Processors"; 2002.*
Greg Semeraro, Energy-Efficient Processor Design Using Multiple Clock Domains with Dynamic Voltage and Frequency Scaling, Proceedings Eighth International Symposium on High Performance Computer Architecture, 2002, 29-40, XP002399255, IEEE Computer, Los Alamitos, CA.
Diana Marculescu, Application Adaptive Energy Efficient Clustered Architectures, Proceedings of the 2004 International Symposium on Low Power Electronics and Design, Aug. 9, 2004, 344-349, XP010764380, International Symposium on Low Power Electronics and Design, New York, New York.
Examination Report under Section 18(3) dated Nov. 6, 2007 from the UK Intellectual Property Office, pp. 1-4.
Anoop Iyer, et al., "Power and Performance Evaluation of Globally Asynchronous Locally Synchronous Processors," 2002 , pp. 1-11.
Greg Semeraro, et al., "Hiding Synchronization Delays In A GALS Processor Microarchitecture," 2004, pp. 1-13.
Joan-Manuel Parcerisa, et al., "Efficient Interconnects For Clustered Microarchitectures," 2002, pp. 1-10.

(Continued)

*Primary Examiner*—Mark Connolly
*Assistant Examiner*—Malcolm D Cribbs
(74) *Attorney, Agent, or Firm*—Trop, Pruner & Hu, P.C.

(57) ABSTRACT

A method and apparatus for scaling frequency and operating voltage of at least one clock domain of a microprocessor. More particularly, embodiments of the invention relate to techniques to divide a microprocessor into clock domains and control the frequency and operating voltage of each clock domain independently of the others.

27 Claims, 3 Drawing Sheets

OTHER PUBLICATIONS

Grigorios Magklis, et al., "Profile-Based Dynamic Voltage And Frequency Scaling For A Multiple Clock Domain Microprocessor," 2003, pp. 1-12.

Greg Semeraro, et al., "Dynamic Frequency And Voltage Control For A Multiple Clock Domain Microarchitecture," 2002, pp. 1-12.

* cited by examiner

FREQUENCY AND VOLTAGE SCALING ARCHITECTURE

FIELD

Embodiments of the invention relate to the field of microprocessor architecture. More particularly, embodiments of the invention relate to a technique to scale frequency and operating voltage of various functional units within a microprocessor.

BACKGROUND

In order to help reduce power in microprocessors while minimizing the impact to performance, prior art techniques for reducing processor clock frequency have been developed. Among these prior art techniques are architectures that divide the processor into various clock domains. For example, one prior art technique has a separate clock domain for the integer pipeline, a separate clock domain for the floating point pipeline, and a separate clock domain for memory access logic.

Using separate clock domains for each pipeline and/or memory access cluster can pose challenges to maintaining the performance of the processor due to the amount of overhead circuitry needed to control each clock domain.

BRIEF DESCRIPTION OF THE DRAWINGS

Embodiments and the invention are illustrated by way of example and not limitation in the figures of the accompanying drawings, in which like references indicate similar elements and in which.

DETAILED DESCRIPTION

Embodiments of the invention relate to a frequency and voltage control architecture for a microprocessor. More particularly, embodiments of the invention relate to techniques to distribute and control a clock and operating voltage among a number of clocking domains within the microprocessor, such that the frequency and operating voltage of each domain can be controlled independently.

Figure 1:
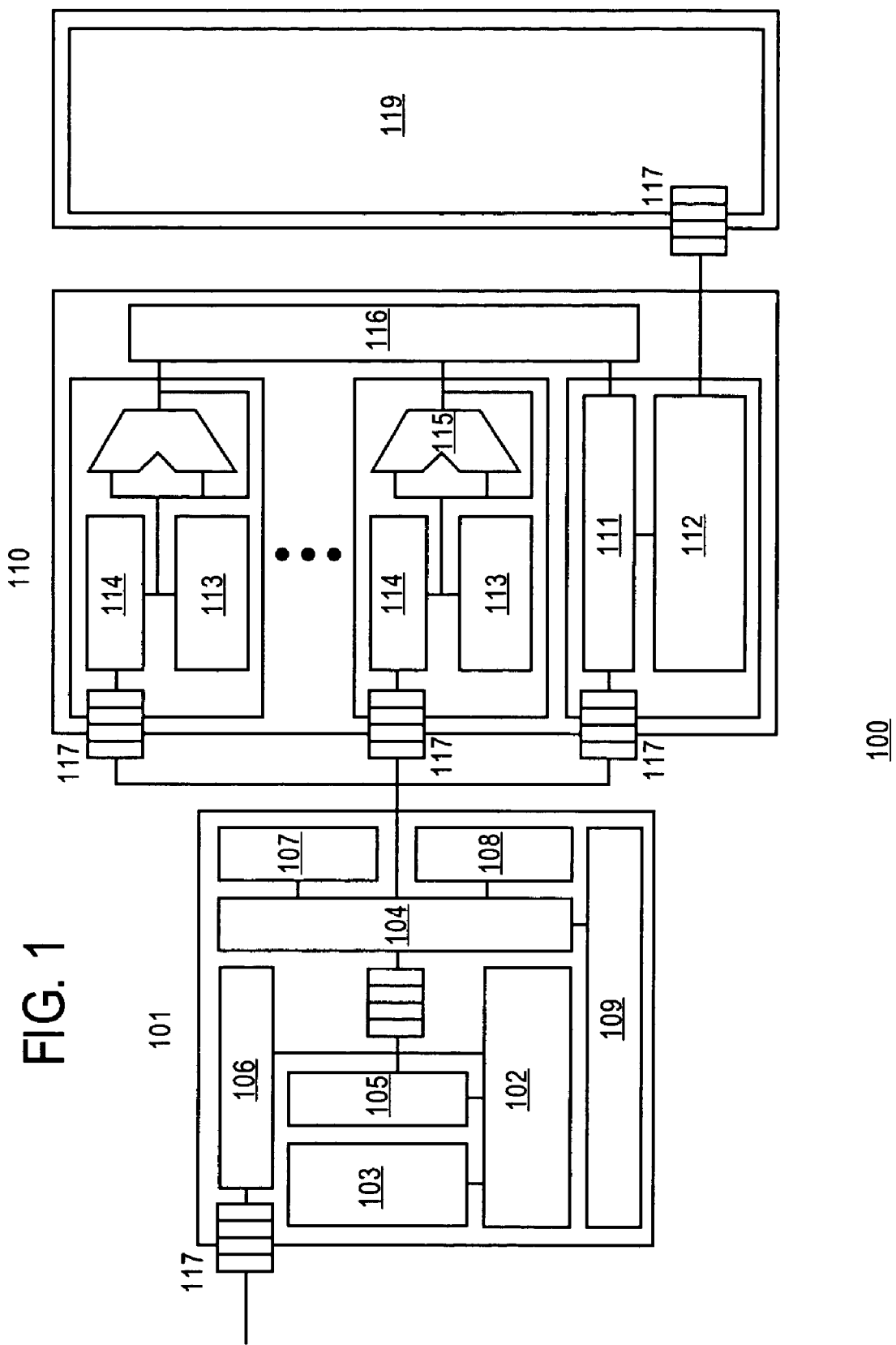
FIG. 1 illustrates a clock and voltage scaling architecture according to one embodiment of the invention.

FIG. 1 illustrates a clock and voltage domain architecture according to one embodiment of the invention. In particular, FIG. 1 illustrates a processor architecture 100 that has been divided into three fundamental clocking domains: A front end domain 101, having a trace cache 102, branch predictor 103, renaming unit 104, decoding unit 105, sequencer 106, free list 107, renaming table 108, and a re-order buffer (ROB) 109; several back end domains 110, having a memory ordering buffer (MOB) 111, a first-level cache 112, physical register files 113, issue queues 114, bus interface 116 and execution units 115; and a memory domain including a second level cache memory 119. In one embodiment, the bus interface is a front-side bus interface, while in other embodiments it is a point-to-point bus interface.

The front-end domain, back-end domains, and the memory domain each have at least one first-in-first-out (FIFO) queue 117 used to help synchronize the exchange of information between the various clock domains. In one embodiment of the invention, at least some of the synchronization queues are queues that provide other functionality within the processor, whereas in other embodiments, the synchronization queues are dedicated to the clock domain control architecture. In addition to clock domains, one embodiment of the invention divides the processor into voltage domains, which can be regulated independently of each other. In at least one embodiment, the clock domains and the voltage domains are the same and include the same functional units, however, in other embodiments the clock domains and voltage domains are not the same and may include different functional units.

In one embodiment of the invention, each clock within the various clock domains may be synchronized to a reference clock. However, in other embodiments, each domain clock may not be synchronous in relation to other domain clocks. Furthermore, in at least one embodiment, the back-end domains may communicate between each other via signals known as "crossbars".

In order to control each of the clock and voltage domains, one embodiment of the invention attempts to minimize a product of the energy and the square of the ("delay$^2$") of each domain by determining the energy and performance of each domain at certain time intervals. Energy and performance may be determined at two time intervals, in at least one embodiment, by calculating the energy and delay of a domain during a first time interval and estimating the energy and delay of the domain in a subsequent time interval. A frequency and voltage pair for the subsequent time interval may then be chosen by minimizing the ratio between the energy-delay$^2$ product of the first time interval and that of the subsequent time interval.

For example, in one embodiment of the invention, the processor energy, "E", for interval n+1 is estimated according to the following equation:

$$\frac{E_{n+1}}{E_n} = 1 + \frac{E_{FE,n}}{E_n} \times \left(\frac{V_{n+1}^2}{V_n^2} - 1\right)$$

In the above equation, "$E_{FE,n}$" is the energy of the front-end domain at time interval "n", where as "$E_{n+1}$" is the energy of the front-end at time interval n+1 and "$V_{n+1}$" is the operating voltage of the front-end domain at time interval n+1, and "$V_n$" is the operating voltage of the front-end domain at time interval n.

Performance of the processor as a function of the frequency of the front-end domain can be estimated by using the clock frequency of the front-end domain for a given time interval, the rate at which instructions are fetched by the front-end, and the rate at which micro-operations (decoded instructions) are delivered to subsequent pipeline stages. In one embodiment, the performance estimation, "$T_{n+1}$", of an interval, n+1, is estimated according to the equation:

$$\frac{T_{n+1}}{T_n} = 1 + \left(\frac{f_n}{f_{n+1}} - 1\right) \times \frac{1 - p_n}{1 + b}$$

In the above equation, "$p_n$" is the average number of entries in the front-end queue for the n-th interval, and "b" is the branch misprediction rate. The value, "1+b", is an indicator of the rate at which the fetch queue may be loaded and "1−pn" is an indicator of average number of entries in the queue. "$T_n$" is the performance of front-end at interval "n", "fn" is the frequency of the front-end domain at interval n, and "$f_{n+1}$" is the frequency of the front-end domain at the following time interval.

Once the energy and performance of the processor has been calculated according to the above equations, in one embodiment, the front-end domain frequency and voltage can be adjusted for the next time interval, n+1, at the end of each time interval, n. In one embodiment, the selection of frequency and voltage is made according to the ratio:

$$R(\langle f, V \rangle) = \frac{E_{n+1}}{E_n} \times \frac{T_{n+1}}{T_n} \times \frac{T_{n+1}}{T_n}$$

The frequency and voltage selected for the interval n+1 are those that minimize the above ratio. If two or more pairs are found that result in the same value, R, then the pair with the minimum frequency is chosen, in one embodiment. The frequency and operating voltage of the front-end domain may then be set to the appropriate values for the interval +1 and the process repeated for the next interval.

Each back-end frequency and operating voltage may be estimated in a similar manner to the front-end, by estimating the energy and performance of the processor as a function of the operating voltage and frequency of each back-end domain and choosing a frequency and operating voltage that minimizes the ratio between the energy performance product between interval n+1 and interval n. In one embodiment, the processor energy, "$E_n$", as a function of the back-end domain energy, "$E_{BE,n}$" is estimated according to the equation:

$$\frac{E_{n+1}}{E_n} = 1 + \frac{E_{BE,n}}{E_n} \times \left( \frac{V_{n+1}^2}{V_n^2} - 1 \right)$$

Performance of the processor as a function of the frequency of each back-end domain can be calculated at each interval, n+1, according to the equation:

$$\frac{T_{n+1}}{T_n} = 1 + S \times (1 - 2m_n)^2 \times p,$$

$$\text{where } p = \frac{-L_{q,n} + \sqrt{L_{q,n}^2 + 4L_{q,n}}}{2}$$

$$\text{and } S = \left( \frac{f_n}{f_{n+1}} - 1 \right) \times \sqrt{\frac{|f_{n+1} - f_n|}{f_{max} - f_{min}}}$$

In the above equation, $m_n$ is the number of second level cache misses divided by the number of committed micro-operations for the interval, n, and $L_{q,n}$ is the average utilization of all micro-operation issue queues for all back-end domains containing execution units. Once the energy and performance of the processor has been calculated according to the above equations, in one embodiment, the back-end domain frequency and voltage can be adjusted for the next time interval, n+1, at the and of each time interval, n. In one embodiment, the selection of frequency and voltage is made according to the ratio:

$$R(f_{n+1}, V_{n+1}) = \frac{E_{n+1}}{E_n} \times \frac{T_{n+1}}{T_n} \times \frac{T_{n+1}}{T_n}$$

The frequency and voltage selected for the interval n+1 are those that minimize the above ratio. If two or more pairs are found that result in the same value, R, then the pair with the minimum frequency is chosen, in one embodiment. The frequency and operating voltage of the back-end domain may then be set to the appropriate values for the interval n+1 and the process repeated for the next interval.

Figure 2:
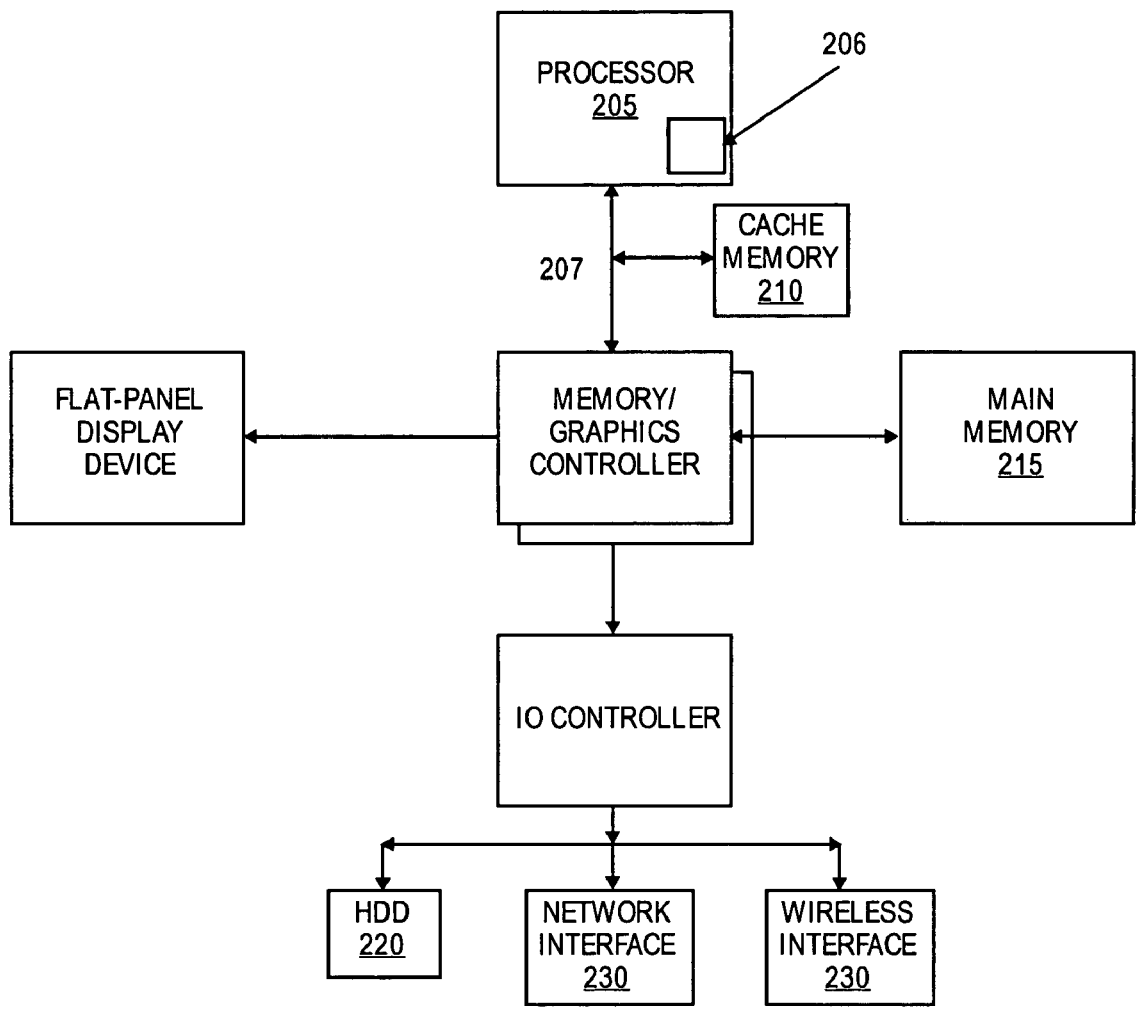
FIG. 2 illustrates a front-side bus computer system in which one embodiment of the invention may be used.

FIG. 2 illustrates a front-side-bus (FSB) computer system in which one embodiment of the invention may be used. A processor 205 accesses data from a level one (L1) cache memory 210 and main memory 215. In other embodiments of the invention, the cache memory may be a level two (L2) cache or other memory within a computer system memory hierarchy. Furthermore, in some embodiments, the computer system of FIG. 2 may contain both a L1 cache and an L2 cache, which comprise an inclusive cache hierarchy in which coherency data is shared between the L1 and L2 caches.

Illustrated within the processor of FIG. 2 is one embodiment of the invention 206. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 220, or a memory source located remotely from the computer system via network interface 230 containing various storage devices and technologies. The cache memory may be located either within the processor or in close proximity to the processor, such as on the processor's local bus 207. Furthermore, the cache memory may contain relatively fast memory cells, such as a six-transistor (6T) cell, or other memory cell of approximately equal or faster access speed.

The computer system of FIG. 2 may be a point-to-point (PtP) network of bus agents, such as microprocessors, that communicate via bus signals dedicated to each agent on the PtP network. Within, or at least associated with, each bus agent is at least one embodiment of invention 206, such that store operations can be facilitated in an expeditious manner between the bus agents.

Figure 3:
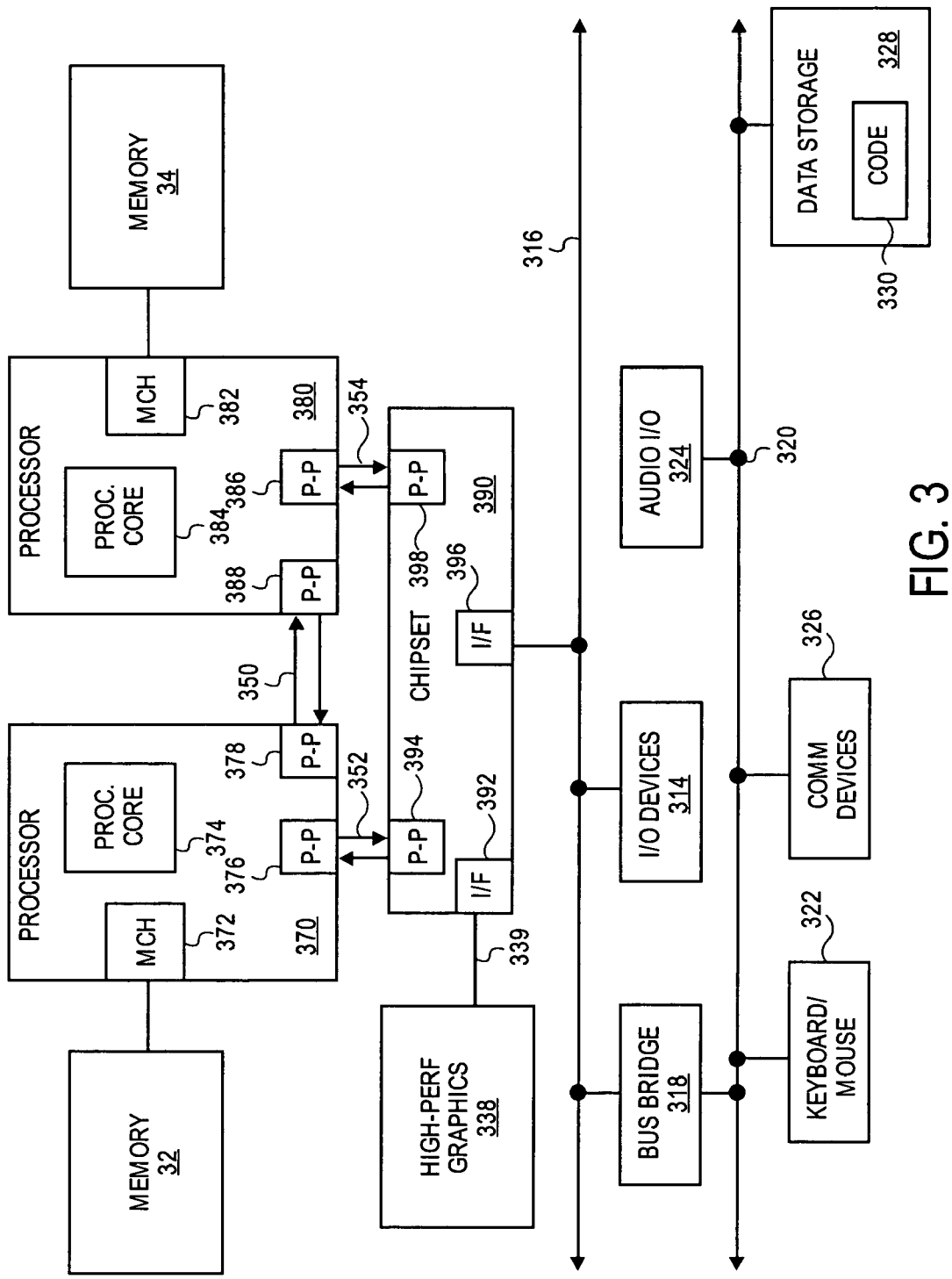
FIG. 3 illustrates a point-to-point computer system in which one embodiment of the invention may be used.

FIG. 3 illustrates a computer system that is arranged in a point-to-point (PtP) configuration. In particular, FIG. 3 shows a system where processors, memory, and input/output devices are interconnected by a number of point-to-point interfaces.

The system of FIG. 3 may also include several processors, of which only two, processors 370, 380 are shown for clarity. Processors 370, 380 may each include a local memory controller hub (MCH) 372, 382 to connect with memory 22, 24. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339.

At least one embodiment of the invention may be located within the PtP interface circuits within each of the PtP bus agents of FIG. 3. Other embodiments of the invention, however, may exist in other circuits, logic units, or devices within the system of FIG. 3. Furthermore, other embodiments of the invention may be distributed throughout several circuits, logic units, or devices illustrated in FIG. 3. In addition, the invention may be implemented by executing of a set of instructions stored on a machine-readable medium.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A processor comprising:
   a first clock domain having a first clock signal frequency and a first operating voltage, the first clock domain including an instruction decoder and a branch prediction unit;
   a second clock domain having a second clock signal frequency and a second operating voltage, the second clock domain including execution units; and
   a third clock domain having a third clock signal frequency and a third operating voltage, the third clock domain including a second level cache memory, wherein the first and second clock domains' clock signal frequency and operating voltage are controlled according to a ratio of energy-delay$^2$ products, wherein the numerator of the ratio is the energy-delay$^2$ product for a first time interval and the denominator of the ratio is the energy-delay product for a second time interval, the second time interval being prior to the first time interval.

2. The processor of claim 1 wherein the first clock domain further comprises, a renaming unit, a sequencer, and a reorder buffer.

3. The processor of claim 1 wherein the second clock domain comprises a register file, and an issue queue.

4. The processor of claim 1 wherein each clock domain comprises a first-in-first-out queue to help synchronize operations among the clock domains.

5. The processor of claim 1 further comprising a fourth and fifth clock domain having a fourth and fifth operating voltage, wherein the second, fourth, and fifth clock domains are able to communicate information between each other via a crossbar.

6. The processor of claim 5 wherein the fourth or fifth clock domain comprises a first-level cache memory and a memory order buffer.

7. A method comprising:
   determining energy and delay of a processor clock domain for a first interval of time;
   determining energy and delay of the processor clock domain for a second interval of time, wherein the second interval of time is later than the first interval of time;
   adjusting an operating voltage and a clock signal frequency of the processor clock domain such that a ratio of a product of the energy and delay for the second time interval and a product of the energy and delay for the first time interval is minimized.

8. The method of claim 7 wherein the determining of energy and delay for the first and second time intervals and the adjusting of operating voltage and clock signal frequency are performed for each of the plurality of clock domains independently of each other.

9. The method of claim 8 wherein the plurality of clock domains are dependent upon a reference clock signal.

10. The method of claim 9 wherein the plurality of clock domains are synchronized, at least in part, via a plurality of first-in-first-out (FIFO) queues corresponding to the plurality of clock domains.

11. The method of claim 10 wherein the plurality of clock domains comprise a front-end domain, a back-end domain, and a second-level cache memory domain.

12. The method of claim 11 wherein the front-end domain comprises an instruction decoder, a renaming unit, a sequencer, a reorder buffer, and a branch prediction unit.

13. The method of claim 11 wherein the back-end domain comprises an execution unit, a register file, and an issue queue.

14. The method of claim 11 wherein the back-end domain comprises a memory order buffer and a first-level cache memory.

15. A system comprising:
   a memory to store a plurality of instructions;
   a processor including a plurality of clock domains having a plurality of independent clock frequencies and independent operating voltages dependent upon a number of the plurality of instructions to be executed by the processor, wherein the plurality of independent clock frequencies and independent operating voltages are to be adjusted such that a ratio of an energy-delay$^2$ product corresponding to a first interval of time and an energy-delay$^2$ product corresponding to a second interval of time is minimized for each of the plurality of clock domains.

16. The system of claim 15 wherein the plurality of clock domains comprise a plurality of functional units to perform a plurality of functions within a plurality of processor pipeline stages.

17. The system of claim 16 wherein the plurality of clock domains comprise a front-end domain, the front-end domain including an instruction decoder.

18. The system of claim 17 wherein the plurality of clock domains comprise a back-end domain, the back-end domain comprising an execution unit to execute the plurality of instructions.

19. The system of claim 18 wherein the plurality of clock domains comprise a memory-domain, the memory domain comprising a second-level cache memory.

20. The system of claim 17 wherein the plurality of clock domains comprise a back-end domain, the back-end domain comprising a memory ordering buffer and a first-level cache memory.

21. The system of claim 20 wherein the plurality of clock domains each comprise at least one first-in-first-out queue to temporarily store data associated with the plurality of instructions until the corresponding domain can operate on the data.

22. The system of claim 21 wherein the back-end domain comprises a plurality of execution units to perform the plurality of instructions and a plurality of crossbars through which to communicate information between the plurality of execution units.

23. A machine-readable medium having stored thereon a set of instructions, which when executed by a machine, cause the machine to perform a method comprising:
   determining energy and delay of a processor clock domain for a first interval of time;
   determining energy and delay of the processor clock domain for a second interval of time, wherein the second interval of time is later than the first interval of time;
   adjusting an operating voltage and a clock signal frequency of the processor clock domain such that a product of the energy and delay for the second interval of time is minimized.

24. The machine-readable medium of claim 23 wherein a ratio of a product of the energy and delay for the second time interval and a product of the energy and delay for the first time interval is minimized.

25. The machine-readable medium of claim 24 wherein the determining of energy and delay for the first and second time intervals and the adjusting of operating voltage and clock signal frequency are performed for each of the plurality of clock domains independently of each other.

26. The method of claim 12, wherein the energy and delay of the front-end domain is estimated based on a rate at which instructions are fetched by the front-end domain.

27. The method of claim 13 wherein the energy and delay of the back-end domain is estimated based on second level cache misses and number of committed micro-operations.

* * * * *